United States Patent [19]

Corona

[11] 4,133,231

[45] Jan. 9, 1979

[54] LATHE TURNING FIXTURE

[76] Inventor: Richard Corona, 1217 ½ E. Fruit, Santa Ana, Calif. 92703

[21] Appl. No.: 815,644

[22] Filed: Jul. 14, 1977

[51] Int. Cl.² .................... B23B 19/02; B23B 23/02
[52] U.S. Cl. ........................................ 82/28 R; 82/45
[58] Field of Search ............... 82/28 R, 33, 40 R, 45, 82/28 B

[56] References Cited

U.S. PATENT DOCUMENTS

| | | | |
|---|---|---|---|
| 1,897,228 | 2/1933 | Beckett | 82/40 R |
| 3,259,394 | 7/1966 | Buck | 82/45 |
| 3,315,551 | 4/1967 | LaMarca | 82/45 |
| 3,962,937 | 6/1976 | Miller | 82/45 |

Primary Examiner—Harrison L. Hinson
Attorney, Agent, or Firm—Gary Appel

[57] ABSTRACT

A lathe turning fixture for use with a lathe having a three jaw chuck, the fixture including a base member having a flange portion and a work receiving threaded opening, the fixture having a first set of adjusting screws extending through the main body of the base member for engaging the face of the chuck, and a second set of three adjusting screws extending through the flange portion for engaging the edges of the jaws, each set of adjusting screws being 120° apart with respect to the base of the flange, the adjustment of the sets of screws adjusting the axis of rotation of the workpiece.

8 Claims, 4 Drawing Figures

LATHE TURNING FIXTURE

BACKGROUND OF THE INVENTION

The background of the invention will be discussed in two parts:

1. Field of the Invention

This invention relates to fixtures for use with machine tools and more particularly to a lathe turning fixture.

2. Description of the Prior Art

In machine shop work, accuracy is of the utmost importance. When utilizing machine tools such as a lathe, a workpiece is rotated about an axis with a suitable cutting tool engaging the workpiece to cut away predetermined portions to create the desired end product. It is especially important in precision machining that the axis of rotation of the workpiece during turning be perpendicular to the face of the workpiece being cut. Any inaccuracies in the axis of rotation result in rejected items.

In lathes, the workpiece is held in place by a suitable chuck such as a three jaw chuck which is secured to the lathe spindle, the chuck having the jaws thereof simultaneously radially positionable for engaging the periphery of a workpiece. If any misalignment exists between the parts of the spindle, chuck and jaws, this misalignment is reflected in the axis of rotation of the workpiece. It is therefore desirable, to achieve accuracies of five or more decimal places, to have the axis of rotation as true as possible.

Accordingly, it is an object of this invention to provide a new and improved lathe turning fixture.

It is another object of this invention to provide a new and improved lathe turning fixture which is adjustable with respect to the chuck face and with respect to the jaw edges.

SUMMARY OF THE INVENTION

The foregoing and other objects of the invention are accomplished by providing a lathe turning fixture including a base member having a body portion, a flange portion and workpiece receiving means. The body portion is circular in cross section and adapted for engagement by the jaws of the chuck with the flange portion in proximate abutting relation with the edges of the jaws of the chuck. First adjustment means extend through the base member for engaging the chuck face for angularly adjusting the position of the base member with respect to the jaws, the second adjustment means including three screws intermediate the first set of three screws for engaging the jaw edges to permit the adjustment of the axis of rotation of the workpiece along angularly displaced lines in a plane perpendicular to the axis of rotation.

Other objects, features and advantages of the invention will become apparent from a reading of the specification when taken in conjunction with the drawings in which like reference numerals refer to like elements in the several views.

DESCRIPTION OF THE PREFERRED EMBODIMENT

Figure 1:
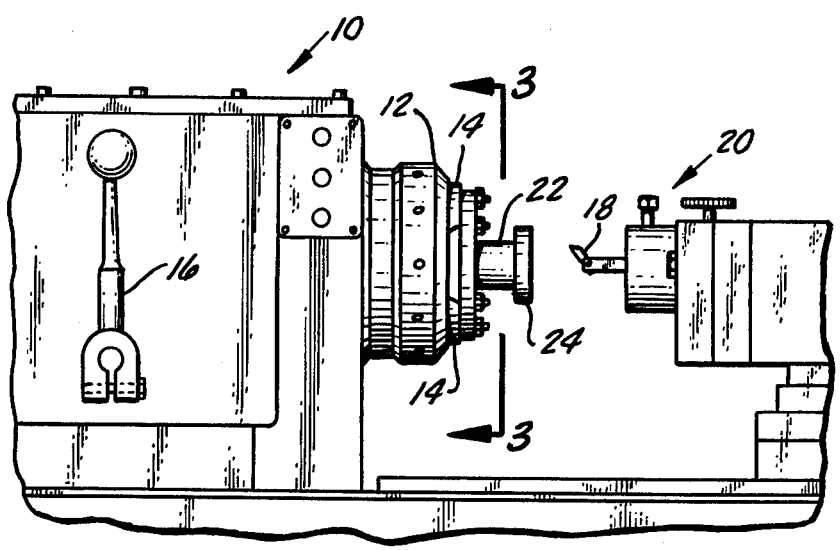
FIG. 1 is a side elevational view showing the lathe turning fixture in operative position on a lathe.

Referring now to the drawings and particularly to FIG. 1, there is shown a lathe generally designated 10 including a lathe chuck 12 having a plurality of jaws 14 suitably adjustable to grip a workpiece. The jaws 14 are generally arcuate-shaped and circumferentially disposed with tapering outer surfaces corresponding to the taper of the seat of the spindle nose of the lathe. The jaws 14 are simultaneously adjustable in an axial direction and with the tapering of the seat, the jaws 14 upon adjustment define a workpiece receiving opening of adjustable diameter to grip or retain the workpiece. This adjustment is effected by the chuck-operating lever 16. During operation, the chuck 12 along with the workpiece is rotated along an axis of rotation and a cutting tool 18 secured to a cutting tool head 20 is moved into position to contact the workpiece to perform the cutting operation.

In the embodiment illustrated in FIG. 1, a lathe turning fixture 22 according to the invention is retained by the jaws 14 of the chuck 12 with a workpiece 24 suitably retained by the lathe turning fixture 22.

Figure 2:
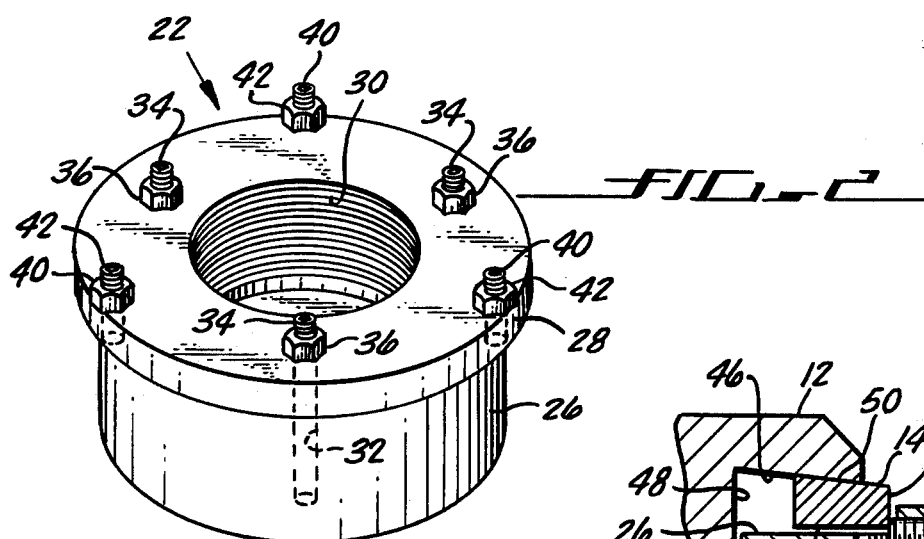
FIG. 2 is a perspective view of the lathe turning fixture according to the invention.

As shown in FIG. 2, the lathe turning fixture generally designated 22 is a base member including a main body portion 26 and a larger diameter flange portion 28, the main body portion 26 having a circular outer periphery of a given diameter with the flange portion 28 being likewise circular in form with a larger diameter. Centrally disposed with respect to the lathe turning fixture 22 and axially extending therein, there is located an enlarged threaded opening 30 for suitably receiving the threaded end of the workpiece 24.

Figure 3:
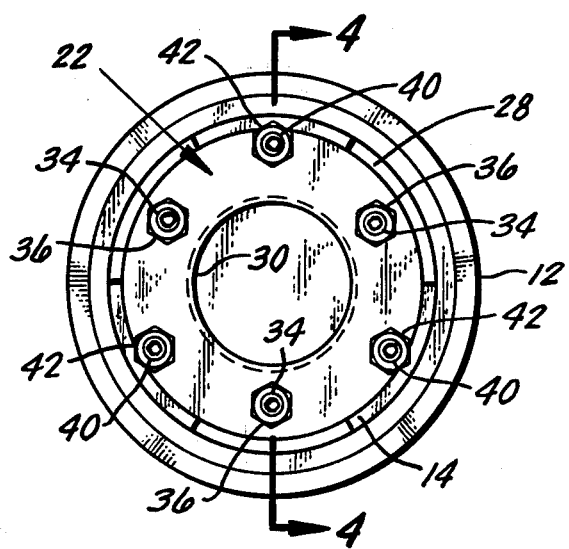
FIG. 3 is a plan view of the lathe turning fixture as viewed along line 3—3 of FIG. 1.
Figure 4:
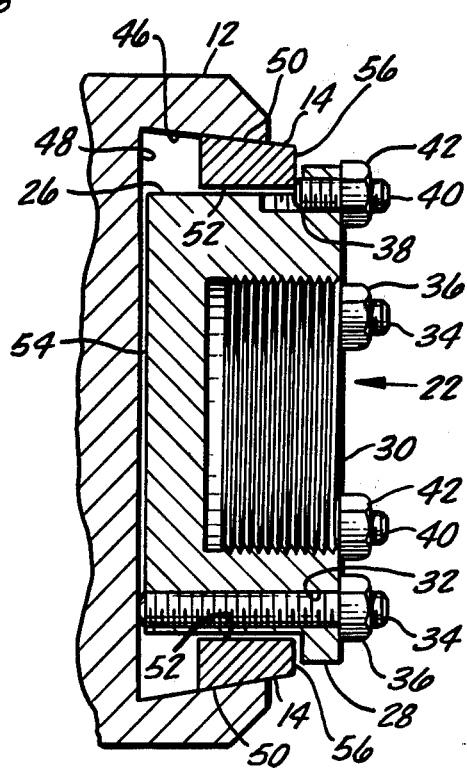
FIG. 4 is a cross-sectional view of the lathe turning fixture taken along line 4—4 of FIG. 3.

As can be seen in FIGS. 2-4, extending axially through the main body portion 26 of the base member or lathe turning fixture 22 there is a first set of adjustment means including threaded apertures 32 extending through the main body portion 26 for receiving set screws 34 therethrough, the set screws 34 being captively retained by suitable lock nuts 36. As best illustrated in FIG. 3, viewing the face of the flange 28, the set screws 34 are equidistant from the center of flange 28 and define a first circle of a given radius. Furthermore, the set screws 34 are angularly displaced with respect to each other and with respect to the face of flange 28 120° apart.

Intermediate the apertures 32, a second set of apertures 38 extend through the base member 22 adjacent the edge of flange portion 28, the apertures 38 receiving therein set screws 40 suitably captively retained by lock nuts 42. As illustrated in FIG. 3, the radial distance of set screws 40 is greater than that of set screws 34 to define a circle of a larger diameter with the set screws 40 being equi-angularly displaced through angles of 120° at positions intermediate the positions of set screws 34.

Referring now to FIG. 4, the lathe turning fixture 22 is shown in assembled relation within the lathe chuck 12, the lathe chuck 12 having an internal axially outwardly tapering seat 46 and a circular chuck face 48. The tapered edges 50 of the jaws 14 coact with the seat 46 to provide the adjustment of jaws 14. Jaws 14 are adjusted in a direction parallel to the axis of rotation of the lathe 10 by suitable means which are not illustrated until the inner edges 52 of the jaws 14 engage the periphery of the main body portion 26 of the lathe turning fixture 22. The jaws 14 are then nominally tightened with the bottom 54 of the lathe turning fixture 22 in spaced proximate relation to the chuck face 48. Correspondingly, the flange 28 is in spaced proximate relation to the leading edges 56 of jaws 14. At this point, each of the lock nuts 36 and 42 is loosened. The workpiece 24 is fixed or retained within the threaded opening 30. The lathe 10 is then rotated at slow speed with a suitable instrument such as an out-of-round indicator or the like contacting a circular surface of the workpiece to indicate the misalignment of the axis of rotation of the workpiece 24. The set screws 34 and 40 are then suitably adjusted until the axis of rotation of the workpiece 24 is "true". As the set screws 34 are tightened, the edges thereof abut against the chuck face 48 to move the lathe turning fixture 22 axially with respect to chuck face 48 to thereby tilt the axis of rotation of the workpiece 24. By providing a plurality of screws 34 about the periphery of the main body portion 26, the angular adjustment of the lathe turning fixture 22 with respect to the chuck face 48 can be accomplished in three mutually exclusive angular directions with respect to a plane perpendicular to the plane of rotation of the workpiece 24. By providing the second set of adjustment means, that is, the second set of three screws 40 for operatively engaging the edges 56 of the jaws 14 three additional mutually exclusive angular positions of adjustment are possible to thereby precisely align the axis of rotation of workpiece 24 with respect to the lathe 10. After all of the set screws 34 and 40 are adjusted to achieve the axis of rotation desired, the lock nuts 36 and 42 are then tightened to bear against the face of the lathe turning fixture 22 to maintain the adjusted settings of set screws 34 and 40. By the utilization of the lathe turning fixture 22 according to the invention precision turning is obtainable beyond the normal limits of the lathe 10 itself.

While the description hereinabove has proceeded on the basis of a three-jaw chuck and accordingly two sets of adjustment means of three screws each have been utilized for this particular configuration, it is to be understood that with a four-jaw chuck two sets of four screws would be utilized to provide the adjustment means. Furthermore, with a chuck having jaws movable radially but not axially, the lathe turning fixture 22 would be suitably configured to operate against the chuck face as well as the jaw edges for the particular configuration of chuck. While there has been shown and described a preferred embodiment, it is to be understood that various other adaptations and modifications may be made within the spirit and scope of the invention.

What is claimed is:

1. In a machine lathe turning fixture for use with a lathe having a chuck with multiple jaw members simultaneously positionable with respect to the chuck face to engage a workpiece, the combination comprising:
   a base member having a main body portion and a flange portion, the main body portion being configured for retention by the chuck with the surface of said body portion in spaced proximate relation to the chuck face with said flange portion in spaced proximate relation to the edges of the jaws of the chuck;
   workpiece receiving means on said base member;
   first adjustment means extending through said base member for engaging the chuck face for angularly adjusting the position of said base member with respect to said chuck face; and
   second adjustment means extending through said base member adjacent said flange portion for engaging the edges of the jaws of said chuck for angularly adjusting the position of said base member with respect to the jaws whereby to permit the adjustment of the axis of rotation of the workpiece along at least two angularly displaced lines in a plane perpendicular to the axis of rotation of the workpiece.

2. The combination according to claim 1 wherein said chuck has three jaw members and said second adjustment means includes three adjustment members for engaging the edges of the three jaws.

3. The combination according to claim 2 wherein said adjustment members are set screws extending through apertures at least partially within said flange portion.

4. The combination according to claim 3 wherein said set screws are equi-angularly spaced about the periphery of said flange portion.

5. The combination according to claim 4 wherein said first adjustment means includes set screws engaging said chuck face.

6. The combination according to claim 5 wherein said first adjustment means includes three set screws equi-angularly positioned with respect to the periphery of said main body portion and intermediate the set screws of said second adjustment means.

7. The combination according to claim 6 wherein said main body portion and said flange portion are circular in cross section.

8. The combination according to claim 7 wherein said workpiece receiving means includes a threaded opening within said base member.

* * * * *